June 15, 1943.  F. C. MARZO  2,321,836
DISPENSING CASK FOR PRESERVING LIQUIDS
Filed Aug. 12, 1940
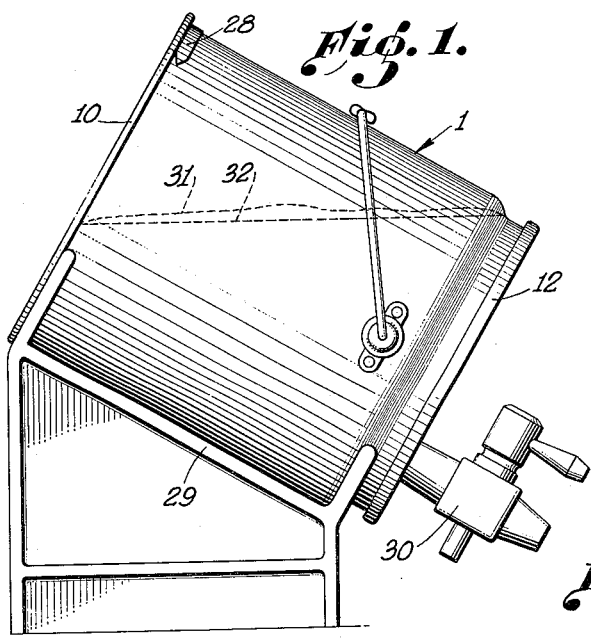
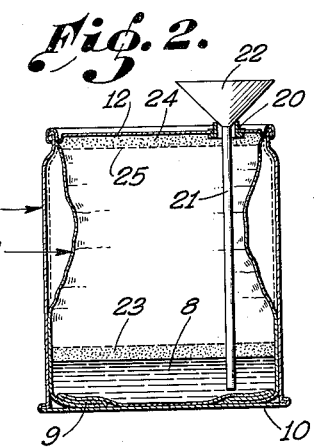
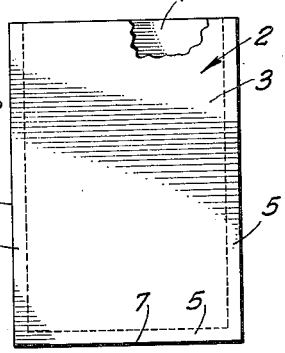
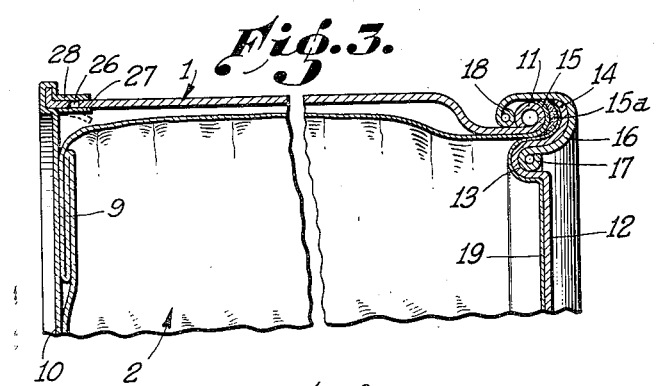
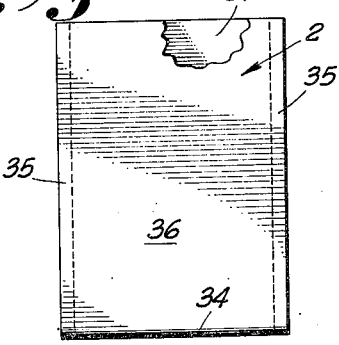
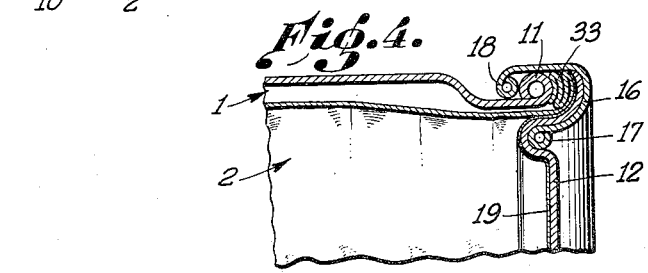
Inventor
FERNANDO C. MARZO,
By Lyon & Lyon
Attorneys.

Patented June 15, 1943

2,321,836

UNITED STATES PATENT OFFICE 2,321,836

DISPENSING CASK FOR PRESERVING LIQUIDS

Fernando C. Marzo, Los Angeles, Calif., assignor of one-third to Alfred G. Rivard, Los Angeles, Calif.

Application August 12, 1940, Serial No. 352,248

5 Claims. (Cl. 225—11)

This invention relates to a cask for air-sensitive liquids such as some kinds of wine.

Certain kinds of wine must be bottled, and cannot be dispensed in small quantities from relatively large containers such as casks or large cans, because the wine will become sour from contact with the air.

One of the objects of this invention is to provide a cask of simple construction, for casking an air-sensitive liquid such as wine, which will enable the wine to be drawn off from the cask without bringing atmospheric air into direct contact with the wine.

When filling casks with wine, it is necessary to leave an air space to allow for expansion of the liquid, and the presence of this air is undesirable as tending to sour a wine that is not proof against souring by contact with air.

In its preferred construction, my invention involves the use of a flexible collapsible liner that is placed within the cask, and which prevents the wine from coming in direct contact with the wall of the cask. In accordance with my invention, when the wine is drawn off the liner collapses; and one of the objects of my invention is to provide simple means for bringing about this mode of operation, but which will not interfere with the handling and shipping of the wine-filled cask.

A further object of the invention is to provide a liner for the cask that can be produced very inexpensively.

Further objects of the invention will appear hereinafter.

The invention consists in the novel parts and combination of parts to be described hereinafter, all of which contribute to produce an efficient cask.

As regards the method, the invention consists in the novel steps and combination of steps, all of which contribute to produce an efficient method for casking wine.

In the drawing:

Fig. 1 is a side elevation illustrating a cask embodying my invention, and illustrating the same set up for withdrawing the wine.

Fig. 2 is a vertical section upon a reduced scale, and illustrating a step in the operation of casking the wine to insure the exclusion of air from the "air space" that must be left when the cask is filled with wine.

Fig. 3 is a vertical section through the cask embodying my invention, upon an enlarged scale and broken away. This view particularly illustrates details in the construction of the cask, and particularly the means for effecting an airtight seal at the head. In this form a gasket is employed for insuring a tight seal for the head.

Fig. 4 is a section upon an enlarged scale, illustrating a modified construction at the lip of the cask, in which the use of a gasket is not necessary to produce a tight seal.

Fig. 5 is a plan illustrating the type of a sack or bag that may be employed as the liner for the cask.

Fig. 6 is a view similar to Fig. 5, but illustrating another manner in which the liner may be formed from sheet material.

Before proceeding to a more detailed description of the invention, it should be stated that I am aware that collapsible liners have been used on casks to enable liquid to be withdrawn off from the cask without necessitating the entrance of air into the cask and in contact with the liquid in the cask. In such cases it has always been necessary to provide a vent in the wall of the container to admit the atmospheric pressure and collapse the liner as the liquid is drawn off. However, none of the casks constructed as suggested have, to my knowledge, presented any means for eliminating air in the air space that it is necessary to leave within the container or cask when it is filled with the liquid. Furthermore, the prior casks and methods referred to above as having been used heretofore, did not provide means for preventing extrusion of the wall of the collapsible liner through the vent, and this, of course, might cause a leak where such casks are handled in shipping. In one case, however, the vent was provided in the bottom of the cask, and the lower end of the collapsible bag was attached to a movable head that seated over the vent, and this would of course avoid any possibility of the wall of the collapsible liner being extruded through the vent, but the use of this movable rigid head is objectionable, one of the reasons for this being that it tends to interfere with the perfect collapsing of the liner; even if it does not do this, its weight always comes against the creased liner below it when the cask is completely empty, thereby tending to weaken the wall of the liner at the creased points.

In accordance with my method of casking the liquid, I eliminate air in the space that must be left under the upper head of the cask when the same is filled with the liquid. Furthermore, I provide a liner that completely lines all of the interior of the body of the cask, and provide a construction for it which enables it to be very inexpensively constructed, and at the same time insuring that a substantially airtight connection at the upper head is effected. The fact that the liner completely lines the body of the cask, makes it unnecessary to coat the inner side of the wall of the body with any protective coating such as enamel, which would prevent any injury to the flavor of the wine carried in the cask. Furthermore, if it were necessary to completely enamel all the interior of such a cask, the cost would be prohibitive for this purpose. I do, however, prefer to line the inner face of the upper head or cover of the cask, with enamel. If desired, however, the head or cover can also be provided with a liner of the same material that I employ for lining the body of the cask.

Referring more particularly to the parts, 1 indicates the body of the cask which is preferably formed of sheet metal, and of cylindrical form. In applying my invention, I provide a liner 2 for this body, said liner being of flexible material so that it is collapsible. This liner is of bag-form, but need not be constructed with a circular bottom to fit perfectly into the body or can 1. This feature makes it possible to construct the liners very inexpensively by forming them out of two sheets 3 and 4 of suitable material superposed upon each other. The material I prefer to use for this purpose is sheet rubber that has been treated with acid to render the same impervious to the action of alcohol in wine. This sheet material is obtainable on the market under the name Pliofilm. It can be sealed by the application of pressure and heat. In this way after superposing the two sheets 3 and 4, they should be sealed along three of their superposed edges 5 by the application of pressure and heat in the manner well known to the workers using such material. When forming the liner 2 in this way, its length measured on the edge 6 should be considerably more than the depth of the body 1 so as to insure that when the liner is inserted in the body 1, there will be ample material at the bottom edge 7 to insure that the liner can be pressed outwardly against the side wall of the can by the pressure of the liquid 8 when the cask is being filled. This of course may result in producing folds 9 at the bottom head 10 of the cask.

Referring to Fig. 3, the cask is preferably formed with a rolled edge or lip 11 at which a tight seal is formed when the upper head 12 of the cask is put in place. For this purpose the head 12 is preferably offset inwardly to form an annular groove 13 beyond which the material is formed outwardly to produce a concavo-convex flange 14 to seat at the lip 11. When the liner is put in place its edge 15 is pulled out over the lip 11, and a gasket 15ᵃ of soft material such as rubber, is placed between the flange 14 and the lip 11 either under the edge 15 or outside of it. The head is then secured in place by means of a resilient snap ring 16 that has a roll 17 at its inner edge to be received in the groove 13, and has a crimped or rolled edge 18 to snap over the outer diameter of the lip 11. In Fig. 3 I illustrate these parts being described, in the relation which they have when the head has been attached and the crimping ring 16 applied.

The upper head 12 as stated, is preferably formed of metal, and its inner face is either lined with the same material employed for forming the liner 2, or else it may be provided with a liner 19 of enamel or similar material that will cover the face of the metal, and which will not be in any way soluble in alcoholic liquid. Hence it will not affect the taste of wine carried in the cask.

In Fig. 2 I illustrate the step of filling the cask with the liquid 8 such as wine. Before introducing the wine, however, I introduce through the filling opening 20 in the head 12, a quantity of an inert gas such as carbon dioxide. I prefer to use this gas because it is not only inert as regards its contact with the surface of the wine, but it also is heavier than air, and if poured into the cask it will accumulate in a layer or stratum at the bottom of the cask. I prefer to introduce the wine without splashing and without letting it fall unconfined to the bottom of the cask, and I prefer to introduce it through the medium of a long tube 21 having a filling funnel 22 at its upper end. This enables the wine to flow in quietly and without disturbing the stratum 23 of carbon dioxide gas which will rise as the liquid fills the cask, eventually arriving at the point 24 at which the usual air space is located. When the liquid level arrives at a point such as that indicated by the line 25, the cask is then closed by applying a suitable sealing cap (not illustrated) to the sleeve of the filling opening 20.

In order to enable the wine to flow freely from the cask, I provide the wall of the body 1 preferably near the bottom 10, with an air vent 26, and in order to prevent any possibility of the pressure of the liquid extruding from the wall of the liner through this vent; and also to exclude air until the wine is to be used, I provide a check valve 27 in the form of a flap valve on the inner side, and a removable seal covering the vent on the outer side. When the liquid or wine is to be dispensed from the cask, it is preferably held in an inclined position such as that indicated in Figure 1. In this figure it is illustrated as supported on a small stand 29 with the filling opening in a depressed position. Before placing the cask in this position, however, a faucet 30 should be applied at the filling opening. Furthermore, this filling opening is located on the opposite side of the cask from the vent 26. This insures that when the cask is set up for use, the vent 26 will be located at the point indicated in Figure 1, that is to say, at a point on the cask that will be uppermost. After the seal or pad 28 has been removed, the faucet 30 can be opened to dispense the liquid in the cask, and as this occurs the flap valve 27 will open automatically to permit the liquid to flow freely, because the atmospheric air can enter at the vent and replace the void that would otherwise occur in the upper portion of the tilted cask. In Figure 1 the dotted line 31 indicates a possible position for the upper wall of the collapsing liner, while the line 32 indicates the level of the wine, the space between the two being filled with the carbon dioxide gas. It will be evident that as the level of the wine falls, the liner wall will continue to collapse, and this collapsing will evidently be complete enough to permit substantially all the wine to be drawn off from the cask. Furthermore, the empty cask can be refilled in the same manner as that described above, and a new pad or seal 28 applied as before.

If it is not desired to employ a gasket or packing ring 16, the effect of a gasket may be attained if desired, by folding the edge of the liner into a series of superposed folds 33 as indicated in Figure 4.

In Figure 6 I illustrate another way of forming the liner. In this instance I form the liner from a long sheet by folding it over at an edge 34 that will be located eventually at the bottom 10 of the cask. I then seal the overlapping side edges 35 of the two layers 36 and 37 together, by the application of heat and pressure. As in the case of the liner formed as illustrated in Figure 5, this liner must be sufficiently long to insure that it can assume the cylindrical form of the interior of the cask adjacent its bottom wall, so that all portions of the liner will rest against the inner face of the wall or bottom, and folds 33 formed at the top.

The casks employed are preferably of inexpensive sheet metal such as steel of small gauge. They are relatively inexpensive as also are the liners, and the casks can be refilled and re-shipped repeatedly if desired.

The valve 28 and pad 27 need not be air-tight. They are applied one on the inside and the other on the outside of the wall respectively. The valve 28 prevents the sack from protruding through the vent 26, and the pad 27 protects the sack from injury from the outside. By removing this pad 27 from the outside, the vent will open automatically when the wine is being drawn off, for freely admitting atmospheric air.

The flap valve 28 may be formed from a piece of adhesive tape secured at one side only of the vent 26 so that it can swing open as indicated by the dotted lines in Figure 3.

Many other embodiments of the invention may be resorted to without departing from the spirit of the invention.

What I claim is:

1. A cask for an air-sensitive liquid consisting of a body with a cylindrical side wall, and a bottom head having a collapsible bag-form, substantially air-tight liner having a flexible integral inner end to lie against the bottom head, an upper head secured to the edge of the body and forming an air-tight seal between the edge of the bag, the edge of the body and the head, said body having a vent through its cylindrical wall adjacent the bottom of the body, a detachable seal consisting of a strip of tape-like material adhering to the outer side of the wall of the cask, covering said vent and adapted to be torn off before the liquid is to be drawn off through the said head, thereby permitting atmospheric air to enter the void created by the withdrawal of the liquid.

2. A cask for an air-sensitive liquid, consisting of a metal body with a cylindrical side wall having a bag-form flexible substantially air-tight liner, an upper head having a protecting covering for its inner face to come in contact with the liquid, said head secured to the edge of the body so as to form an air-tight seal between the edge of the bag, the edge of the body and the head, said body having a vent through its cylindrical wall adjacent the bottom, and a destructible seal adhering to the outside of the cylindrical wall, covering said vent and adapted to be removed before the liquid is to be drawn off through the said head, said seal operating to prevent the wall of the liner from being extruded through the vent and operating when broken and removed to permit the atmospheric air to enter and fill the void created by the withdrawal of the liquid as the liner collapses.

3. A cask for an air-sensitive liquid, consisting of a metal body having a collapsible bag-form substantially air-tight liner, said liner consisting of two superposed layers of sheet material secured together at their edges and distended into substantially cylindrical form by the liquid to form a sack having a wall composed of a single thickness of the sheet material to fill the interior of the cask, and a head clamping the edge of the liner onto the lip of the cask body to form an air-tight seal, said head having the filling inlet for admitting the liquid to the interior of the liner.

4. A cask for an air-sensitive liquid, consisting of a cylindrical metal body having a collapsible bag-form substantially air-tight liner, an upper metal head having an enamel lining to come in contact with the liquid, with its edge seating over the edge of the liner and the lip of the body, and a gasket between said edge and the lip of the body, said cask having a vent through the cylindrical wall thereof adjacent its bottom with a valve covering said vent on its inner side operating to prevent the pressure of the liquid extruding the wall of the liner through the vent, a detachable seal covering said vent on the outer side, said vent operating when the said seal is detached, to permit the entrance of atmospheric air to fill the void created within the cask between the liner and the wall of the cask when the liner collapses as the liquid is drawn off.

5. A cask for an air-sensitive liquid, consisting of a body having a cylindrical side wall, and having a collapsible bag-form substantially air-tight liner, said body having a bottom head, and an upper head secured to the edge of the cylindrical side wall and forming an air-tight seal between the edge of the bag, the edge of the cylindrical wall and the head, said cylindrical wall having a vent through the same adjacent the bottom of the body, a flap valve of flexible material covering said vent on the inner side of the cylindrical wall, said flap valve being capable of operating as a valve while leaving the outer face of the wall at said vent unobstructed, and permitting atmospheric air to enter the void in the cask on the outer side of the liner, created by the withdrawal of the liquid.

FERNANDO C. MARZO.